United States Patent [19]

Fujita

[11] 4,307,366

[45] Dec. 22, 1981

[54] DISPLACEMENT SENSOR

[75] Inventor: Yutaka Fujita, Tokyo, Japan

[73] Assignees: TDK Electronics Co., Ltd., Tokyo; Nippondenso Co., Ltd., Aichi, both of Japan

[21] Appl. No.: 61,073

[22] Filed: Jul. 26, 1979

[30] Foreign Application Priority Data

Aug. 5, 1978 [JP] Japan .................... 53-107865[U]

[51] Int. Cl.³ .............................................. H01F 21/06
[52] U.S. Cl. .................................................. 336/136
[58] Field of Search ............... 336/136, 130, 83, 200, 336/192, 90

[56] References Cited

U.S. PATENT DOCUMENTS

| 2,507,344 | 5/1950 | Macgeorge | 336/136 X |
| 2,568,587 | 9/1951 | Macgeorge | 336/136 |
| 2,640,967 | 6/1953 | Macgeorge | 336/136 |
| 3,027,527 | 3/1962 | West | 336/136 X |
| 3,113,280 | 12/1963 | Hobley | 336/136 X |

FOREIGN PATENT DOCUMENTS 632071 11/1949 United Kingdom ................ 336/136

Primary Examiner—Thomas J. Kozma
Attorney, Agent, or Firm—Armstrong, Nikaido, Marmelstein & Kubovcik

[57] ABSTRACT

A displacement sensor which provides the output electrical signal proportional to the mechanical movement or displacement, without utilizing the mechanical friction. The present displacement sensor comprises of a cylindrical bobbin, a pair of solenoid coils provided on said bobbin with the predetermined spacing between each coils, the length of each of the solenoid coils being the same as that each other, a ferrite core adjustably inserted in said bobbin, a support connected to said ferrite core and an external device the displacement of which is to be sensed, a means for connecting the leads of said coils to external lead lines, and the length of said ferrite core being so defined that the total inductance of the series connected coils is independent from the position of said ferrite core in said bobbin.

3 Claims, 13 Drawing Figures

DISPLACEMENT SENSOR

BACKGROUND OF THE INVENTION

The present invention relates to a non-contact type displacement sensor, which does not suffer from mechanical friction slide.

The present sensor can be utilized, for instance, as the sensor which converts the displacement of an acceleration pedal of a vehicle, and control the fuel injection or a throttle valve of an engine according to the displacement of said pedal. The fine control of the fuel injection depending upon the displacement of the pedal is important to keep clean exhaust gas from an engine, thus the device for converting the displacement of the pedal to the electrical output signal has been requested.

A prior displacement sensor utilizes a potentiometer (P) energized by the direct current (DC) power source (DC) as shown in FIG. 1. In FIG. 1, the movable contact (p) slides on the resistance surface according to the displacement to be sensed, and thus an electrical voltage proportional to said displacement is obtained between the movable contact (p) and the ground (E).

However, the prior displacement sensor shown in FIG. 1 has the disadvantage that the resistance surface of a potentiometer undergoes heavy wear, and the life time of the potentiometer is not long because of the frictional slide of the movable contact on the resistance surface. Then, the life time of the sensor itself must be rather short.

SUMMARY OF THE INVENTION

It is the object, therefore, of the present invention to overcome the disadvantages and limitations of a prior displacement sensor by providing a new and improved displacement sensor.

It is also an objective of the present invention to provide a displacement sensor in which no frictional contact is utilized for sensing the displacement, and the electrical output signal is linearly proportional to the mechanical displacement.

The above and other objects are attained by a displacement sensor having a cylindrical bobbin, a pair of solenoid coils provided on said bobbin with the predetermined spacing between each coils, the length of each solenoid coils being the same as that each other, a ferrite core adjustably inserted in said bobbin, a support connected to said ferrite core and an external device the displacement of which is to be sensed, means for connecting the leads of said coils to external lead lines, and the length of said ferrite core being so defined that the total inductance of the series connected coils is independent from the position of said ferrite core, and the inductance of each coils changes linearly according to said position of said ferrite core.

BRIEF DESCRIPTION OF THE DRAWINGS

The foregoing and other objects, features, and attendant advantages of the present invention will be more highly appreciated as they become better understood by means of the following descriptions and accompanying drawings wherein.

DESCRIPTION OF THE PREFERRED EMBODIMENTS

First, the electrical property of the present invention will be described in accordance with FIGS. 2 through 7.

Figure 1:
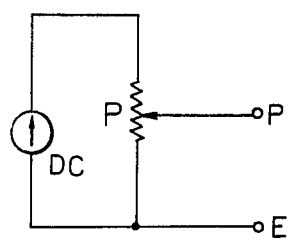
FIG. 1 shows the circuit of a prior displacement sensor.
Figure 2:
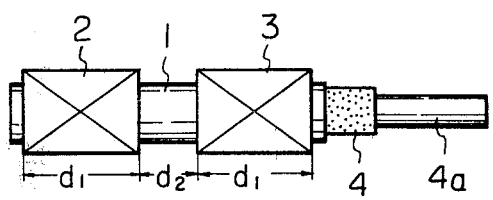
FIG. 2 shows the principle structure of the displacement sensor according to the present invention.
Figure 3:
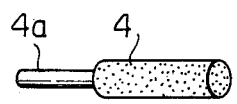
FIG. 3 shows the structure of the ferrite core mounted on the support.

FIG. 2 shows the structure of the main portion of the displacement sensor according to the present invention, and FIG. 3 shows the structure of the ferro-magnetic core utilized in the sensor of FIG. 2. In those figures, the reference numeral 1 is a cylindrical hollow bobbin made of plastics. On the bobbin 1, a pair of solenoid coils 2 and 3 are wound with a predetermined spacing $d_2$. It is supposed that those coils are connected in series with each other, and a center tap is provided at the junction between two coils. In the bobbin 1, the elongated ferromagnetic core 4 made of, for instance, ferrite core, is inserted. The core 4 has the elongated support 4a of a non-magnetic material at the end of the same.

It should be noted that the assembly of the core 4 and the support 4a is slidably inserted in the bobbin 1 so that the inductance of the coils 2 and 3 depends upon the position of the core 4.

Preferably, the inductance of one of the coils 3 decreases linearly as the core 4 is moved into the bobbin 1, the inductance of the other coil 2 is increased as the core 4 is inserted in the bobbin 1, and the total inductance of the series connection of the coils 2 and 3 is independent from the position of the core 4.

Figure 4:
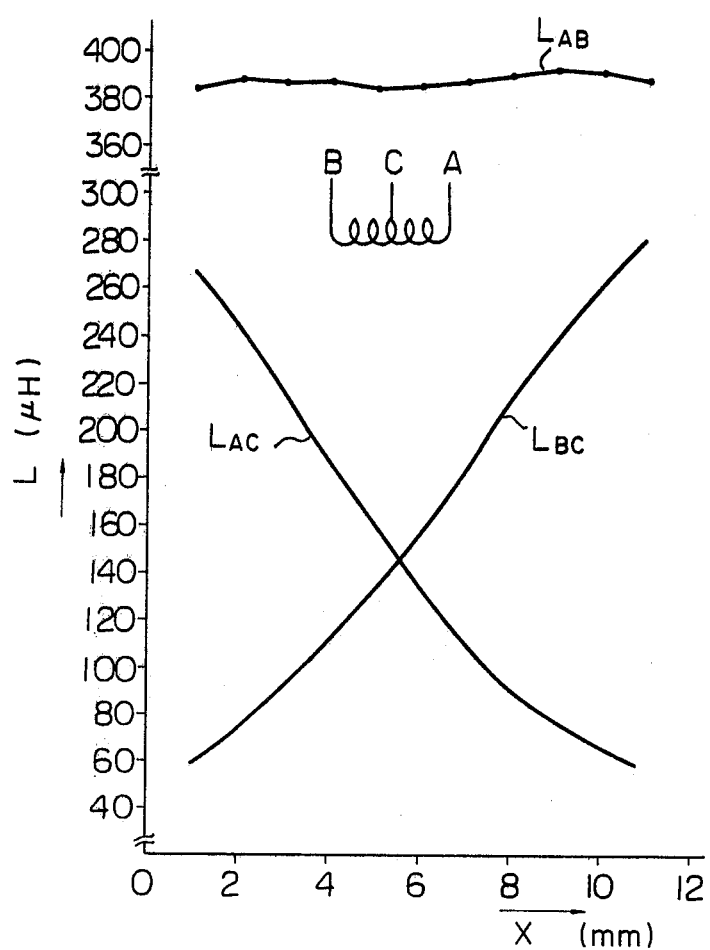
FIG. 4 shows the experimental result concerning the relationship between the position of the ferrite core and the inductance of the coils.
Figure 5:
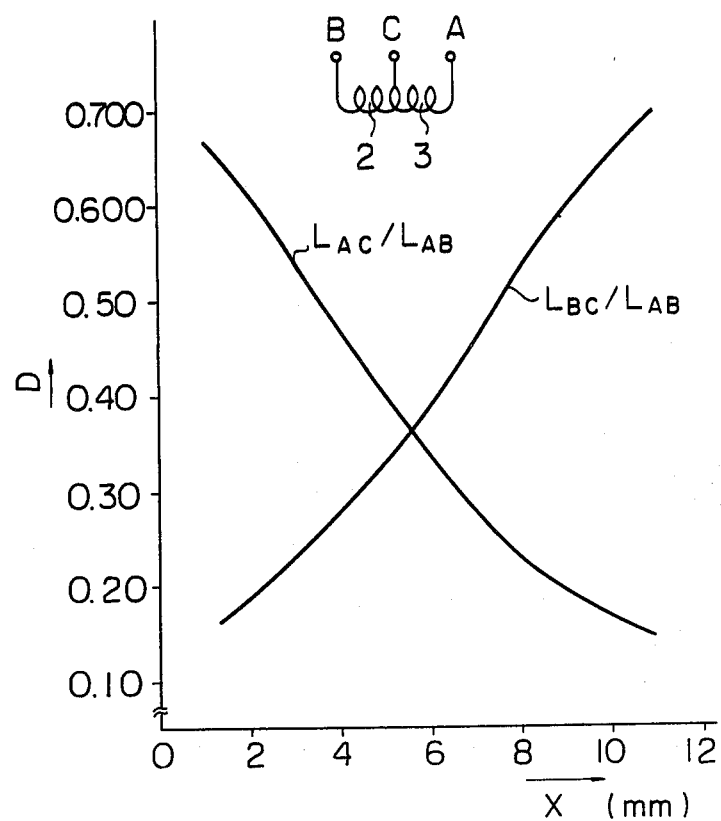
FIG. 5 shows the normalized curves of those in FIG. 4, FIG. 6($a$) and FIG. 6($b$) are drawings for the explanation of the experimental condition in FIGS. 4 and 5.
Figure 6:
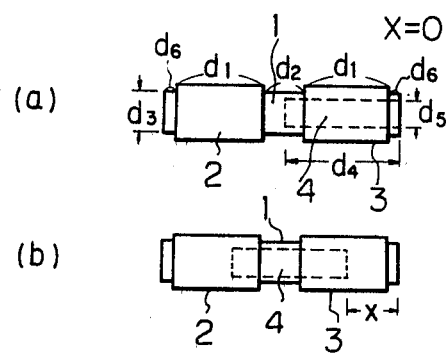

FIG. 4 and FIG. 5 show the experimental result concerning the inductance of the coils when the core 4 is adjusted. In FIG. 4, the horizontal axis shows the moving length (X) in mili-meters of the core 4, and the vertical axis shows the inductance in micro henry of the coils 2 and 3 and the series connection of two coils. The curve $L_{AC}$ shows the inductance of the coil 3 between the terminals (A) and (C), and the curve $L_{BC}$ shows the inductance of the coil 2 between the terminals (B) and (C), and the curve $L_{AB}$ shows the inductance of the series connection of the coils 2 and 3 between the terminals (A) and (B). In the experiment of FIG. 4, the experimented conditions are described in accordance with FIG. 6; the length $d_1$ of each solenoid coils 2 and 3 is 15 mm, the length $d_2$ between the near ends of two coils is 7 mm, the length $d_3$ which is the external diameter of the bobbin 1 is 7.5 mm, the length $d_4$ of the ferrite core 4 is 20 mm, the length $d_5$ which is the diameter of the ferrite core 4 is 4 mm, the length $d_6$ between the end of the bobbin 1 and the end of the coil 2 or 3 is 2 mm, the relative permiability ($\mu$) of the ferrite core 4 is 2,500, and the number of turns of each coils 2 and 3 is 112 turns. Furthermore, the reference point of the length (X) of the horizontal axis in FIG. 4 is the position that the right end of the core 4 coincides with the right end of the bobbin 1 as shown in FIG. 6(a), and the length (X) is measured between said right end of the bobbin 1 and the right end of the core 4 as shown in FIG. 6(b).

It should be appreciated in FIG. 4 that the curve $L_{AC}$ decreases approximately linearly when the core 4 is inserted in the bobbin 1, while the curve $L_{BC}$ increases approximately linearly when the core 4 is inserted in the bobbin 1, thus the total inductance shown by the curve $L_{AB}$ is almost constant and is independent from the position of the core 4.

FIG. 5 shows the normalized inductances of the coils 2 and 3, and the horizontal axis shows the length (X) and the vertical axis shows the normalized inductance (D). The normalized inductance is defined as $L_{AC}/L_{AB}$, or $L_{BC}/L_{AB}$. Since the total inductance $L_{AB}$ is constant, and the inductances $L_{AC}$ and $L_{BC}$ changes linearly, as shown in FIG. 4, it is quite apparent that the normalized inductance $L_{AC}/L_{AB}$ and/or $L_{BC}/L_{AB}$ is linear as shown in FIG. 5.

The linear relationship between the length (X) and the inductance is very important for a displacement sensor, and that linear relationship as shown in FIG. 4 or FIG. 5 is the important feature of the present invention.

Figure 7:
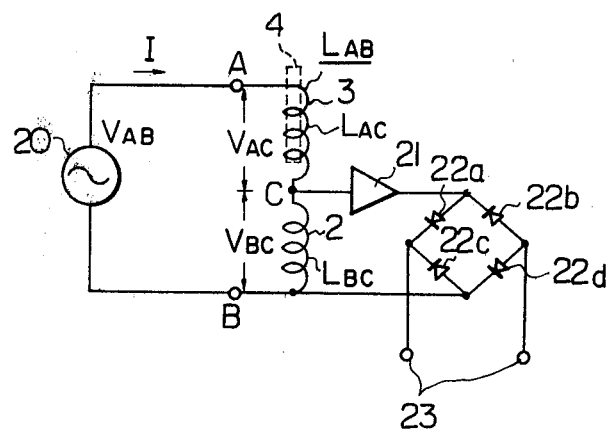
FIG. 7 is the circuit diagram utilizing the present displacement sensor.

FIG. 7 shows the circuit diagram for providing the sensor output signal in proportion to the length (X) utilizing the present displacement sensor. In FIG. 7, the alternate current power source 20 provides the alternate signal of angle frequency $\omega$ and of the voltage $V_{AB}$, then the current (I) flows in the series connected coils 2 and 3. In this case, the voltage $V_{AB}$ between the terminals A and B of the series connected coils 2 and 3, the voltage $V_{AC}$ between the terminals A and C of the coil 3, and the voltage $V_{BC}$ between the terminals C and B of the coil 2 are shown as follows.

$$V_{AB} = \omega L_{AB} I \quad (1)$$

$$V_{AC} = \omega L_{AC} I \quad (2)$$

$$V_{BC} = \omega L_{BC} I \quad (3)$$

By substituting the formula (1) to the formulae (2) and (3), the following two formulae are obtained.

$$V_{AC} = (L_{AC}/L_{AB}) \cdot V_{AB} \quad (4)$$

$$V_{BC} = (L_{BC}/L_{AB}) \cdot V_{AB} \quad (5)$$

Since the voltage $V_{AB}$ is constant, and the normalized inductances ($L_{AC}/L_{AB}$) and ($L_{BC}/L_{AB}$) change linearly in accordance with the change of the position of the core 4, the voltages $V_{AC}$ and $V_{BC}$ depend linearly upon the change of the position (X) of the core 4, irrespective of the frequency of the power source 20. Further, it should be noted that the current (I) is constant irrespective of the position of the core, since the total inductance is constant. Accordingly, the output terminal 23 in FIG. 7, which is connected to the terminals B and C of the coil 2 through the buffer amplifier 21 and the rectifier having diodes 22a, 22b, 22c and 22d, provides the direct current (DC) output signal, the amplitude of which is proportional to the position of the core 4.

It should be appreciated that the linear relationship is obtained by the particular relationship among the length $d_4$ of the core 4, the length $d_1$ of each solenoid coils 2 and 3, and the length $d_2$ between two coils. If the magnetic flux leaked from edges of the core 4 and/or the coils 2 and 3 were neglected, the length $d_4$ of the core 4 should be the sum of the length $d_1$ of each of the solenoid coils and the duration $d_2$ in order to obtain the relationship that the inductance of the coil 3 decreases linearly, the inductance of the coil 2 increases linearly, and the total inductance of the series connected coils 2 and 3 is constant. However, in the actual embodiment, the length $d_4$ of the core 4 is a little shorter than the sum $d_1 + d_2$, and a short chip $d_6$ is provided between the edges of the coil and the bobbin in order to compensate for the edge effect of the magnetic flux around the core 4. Accordingly, the formula below must be satisfied in order to obtain the linear relationship.

$$d_4 = d_1 + d_2 - \Delta$$

Preferably the value $\Delta$ is approximate one half of the diameter $d_3$ of the bobbin.

Also, it should be noted that the number of turns of the coil 2 must be the same as that of the coil 3 and the length $d_1$ of those coils must be the same in order to maintain the constant total inductance.

Next, the practical structure embodying the present invention will be described in accordance with FIGS. 8 through 11.

Figure 8:
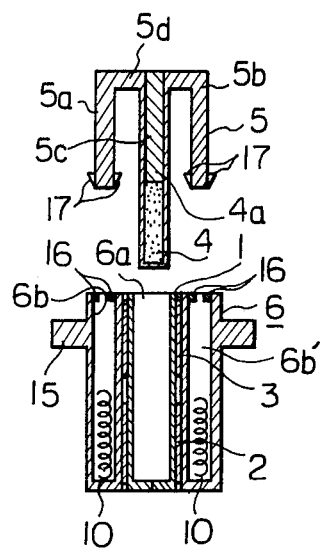
FIG. 8 is the cross sectional view of the practical embodiment of the present displacement sensor.
Figure 9:
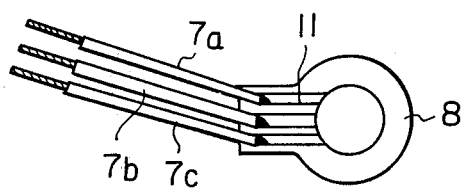
FIG. 9 is the bottom view of the printed circuit which is to be mounted on the displacement sensor shown in FIG. 8.
Figure 10:
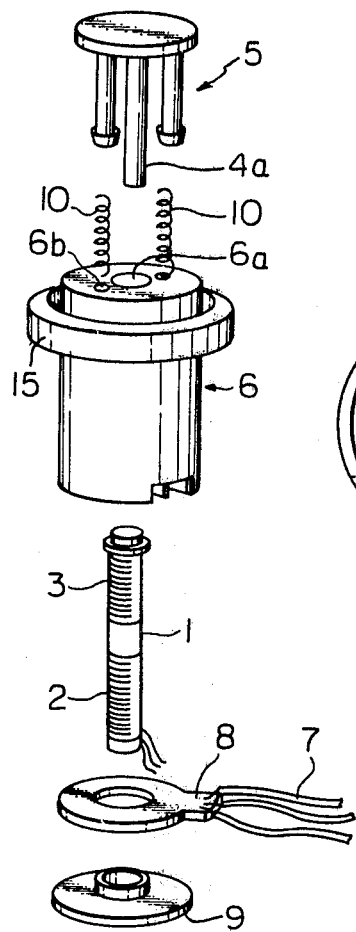
FIG. 10 is the disassembled drawing of the sensor shown in FIG. 8.

FIG. 8, FIG. 9 and FIG. 10 show the first embodiment of the structure of the displacement sensor according to the present invention, in which FIG. 8 is the cross sectional view of the sensor, FIG. 9 is the plane view of the connector assembly attached at the bottom of the sensor, and FIG. 10 is the perspective view of the disassembled sensor. The present displacement sensor has a stroke means 5 having a pair of short side legs 5a and 5b, and a long center leg 5c, a housing 6, a bobbin 1 with a pair of coils 2 and 3, a printed circuit 8, and an end cap 9. The center leg 5c and the pair of the side legs 5a and 5b of the stroke means 5 are connected together by the bridge 5d. The center leg 5c has the support 4a and the ferrite core 4 inserted in the leg 5c at the end of the same. The housing 6 is substantially in the shape of a circular cylinder having a ring 15, the center hole 6a for accepting the bobbin 1 with the coils 2 and 3, and the pair of side holes 6b and 6b' for receiving the corresponding pair of side legs 5a and 5b of the stroke means 5. The bobbin 1 with the coils 2 and 3 are fixed in the center hole 5a through the adhesive process. The side holes 6b and 6b' have a resilient ring 16 at the top of the same, and said rings 16 engage with the corresponding ring 17 when the stroke means 5 is inserted in the housing 6. Since the ring 17 on the legs 5a and 5b has the slope like a circular cone, the pair of legs 5a and 5b are pushed against the cone shaped rings 17 when the stroke means 5 is inserted in the housing 6, and after said stroke means 5 is inserted in the housing 6, the resilient cone rings operate as a stopper to prevent the legs from being drawn out. It should be noted that a pair of springs 10 are inserted in the side holes 6b and 6b' before said stroke means 5 is inserted in the housing 6 in order to give the return tension to the stroke means 5.

The printed circuit 8 which has three lead wires 7a, 7b and 7c each connected to the corresponding conductive patterns 11, is attached at the bottom of said housing 6 through either the adhesive process or melting process of the plastic material. The lead lines A, B and C of the coils 2 and 3 are connected to the external lead lines 7a, 7b and 7c, respectively, through the conductive pattern 11 of said printed circuit 8. The wire of the coils 2 and 3 is very thin and weak, and is easily broken, so the connection of the wire of the coils and the external lead lines through the printed circuit 8 prevents the wire of the coils to be broken. The cap 9 covers the bottom of the housing 6 so that the conductors on the printed circuit 8 are hidden in the insulator, and the bobbin 1 is mounted on the cap 9.

Figure 11:
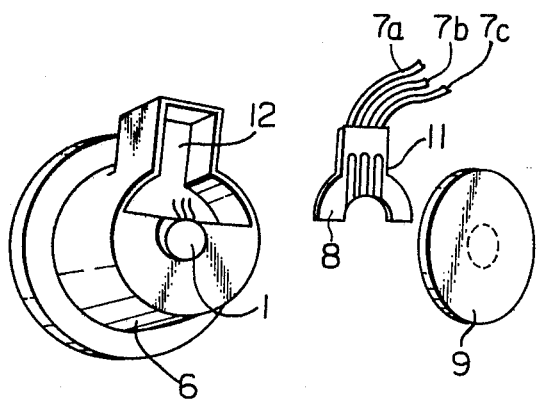
FIG. 11 is the modification of the housing and the printed circuit of the displacement sensor shown in FIG. 8.

FIG. 11 is the modification of the housing 6 and the printed circuit 8. In FIG. 11, the housing 6 has the rectangular box 12 at the side wall near the bottom of the housing 6, and said box 12 receives the printed circuit 8, which is the shape of approximately a half ring as shown in the drawing, and the printed circuit 8 has the rectangular portion which is engaged with said box 12. In the modification shown in FIG. 11, the rotation of the printed circuit 8 is completely prevented by the engagement of the box 12 and the printed circuit, thus, the external lead lines and the wires of the coils are protected against the external disturbance.

The material of a stroke means and the housing is plastic, for instance, Polybutylene Terephthalate (PBT).

In a practical use, the housing is fixed to a body of a vehicle using a belt (not shown) or the like.

Figure 12:
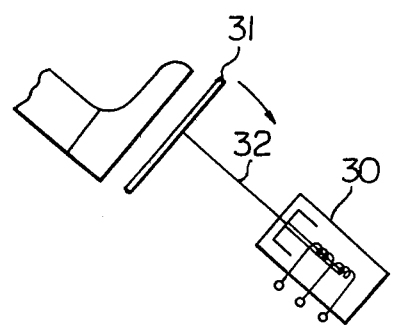
FIG. 12 shows one of the applications of the present displacement sensor.

FIG. 12 shows the application of the present displacement sensor, and the acceleration pedal 31 of a car is connected to the present displacement sensor 30 through the engagement means 32 which may includes some gears and/or levers. When one steps on the acceleration pedal 31, the movement of said pedal is transferred to the displacement sensor 30, which in turn provides the electrical output signal indicating the value of the acceleration. Said electrical output signal which depends linearly upon the acceleration is utilized to control the fuel injection into an engine or the supply of air.

As described in detail, the present displacement sensor is simple in structure and has no friction slide like the prior displacement sensor utilizing a potentiometer. Furthermore, the present displacement sensor can provide the output signal which depends linearly upon the change of the input mechanical movement. Thus, it is conveniently applicable to control the fuel injection and/or air supply to an internal combustion engine of a vehicle.

From the foregoing, it should now be apparent that the new and improved displacement sensor has been found.

It should be understood of course that the embodiments disclosed are merely illustrative and are not intended to limit the scope of the invention. Reference should be made to the appended claims, therefore, rather than the specification as indicating the scope of the invention.

What is claimed is:

1. A displacement sensor comprising a cylindrical housing having an elongated center hole and a pair of side holes parallel to said center hole, a stroke means having a center leg and a pair of side legs connected together by a bridge arm, a ferrite core mounted in said center leg, a bobbin having a pair of solenoid coils with a predetermined spacing therebetween, a pair of springs each of which is inserted in each of said side holes of the housing, said bobbin being positioned in said center hole of said housing and the legs of said stroke means being inserted in said side holes, a printed circuit mounted at the bottom of the housing to provide the electrical connection between said coils and an external circuit, and an end cap for covering said printed circuit, wherein the length of said ferrite core is such that the total inductance of the series connected solenoid coils is independent from the position of said stroke means.

2. A displacement sensor according to claim 1, further comprising of a pair of rings provided at the top of each of said side holes, and a pair of cone shaped rings at the extreme end of each of said side legs for preventing the stroke means from being disconnected from the housing.

3. A displacement sensor according to claim 1, further comprising of a hollow box provided on the side wall near said bottom of the housing, wherein said box engages the printed circuit in order to prevent the rotation of the printed circuit.

* * * * *